US012613035B1

(12) United States Patent
Wilkinson

(10) Patent No.: US 12,613,035 B1
(45) Date of Patent: Apr. 28, 2026

(54) COMBUSTION SECTION FOR A TURBINE ENGINE

(71) Applicant: GENERAL ELECTRIC COMPANY, Evendale, OH (US)

(72) Inventor: Keith W. Wilkinson, Portsmouth, NH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/886,317

(22) Filed: Sep. 16, 2024

(51) Int. Cl.
*F23R 3/28* (2006.01)
*F02C 7/22* (2006.01)
*F23R 3/00* (2006.01)

(52) U.S. Cl.
CPC ............... *F23R 3/28* (2013.01); *F02C 7/222* (2013.01); *F23R 3/002* (2013.01)

(58) Field of Classification Search
CPC .. F02C 7/222; F02C 7/228; F23R 3/28; F23R 3/50
See application file for complete search history.

(56) References Cited

U.S. PATENT DOCUMENTS

| | | |
|---|---|---|
| 2,616,258 A | 11/1952 | Mock |
| 4,466,240 A | 8/1984 | Miller |
| 4,938,019 A | 7/1990 | Angell et al. |
| 5,328,102 A | 7/1994 | Babitzka et al. |
| 6,250,062 B1 | 6/2001 | Lawen, Jr. et al. |
| 7,703,286 B2 | 4/2010 | Morenko et al. |
| 9,068,508 B2 | 6/2015 | Fish et al. |
| 9,714,767 B2 | 7/2017 | Stewart et al. |
| 9,797,313 B2 | 10/2017 | Morenko |
| 9,879,606 B2 | 1/2018 | Morenko et al. |
| 10,294,865 B2 | 5/2019 | Morenko |
| 11,092,084 B2 | 8/2021 | Kim et al. |
| 11,255,370 B2 | 2/2022 | Pinney |
| 2007/0003897 A1 | 1/2007 | Koizumi et al. |
| 2015/0159877 A1 | 6/2015 | Stoia et al. |
| 2019/0107285 A1* | 4/2019 | Morenko .................. F23R 3/34 |
| 2019/0301369 A1* | 10/2019 | Muruganandam ........ F23R 3/14 |
| 2019/0309686 A1* | 10/2019 | Ryon ....................... F23R 3/283 |
| 2022/0034259 A1* | 2/2022 | Humes ....................... F02C 3/08 |
| 2023/0060238 A1 | 3/2023 | Yeager et al. |
| 2023/0160574 A1* | 5/2023 | Binek ..................... F01D 9/023 60/740 |
| 2023/0194097 A1 | 6/2023 | Hart et al. |

FOREIGN PATENT DOCUMENTS

| | | |
|---|---|---|
| CN | 217526000 U | 10/2022 |
| EP | 3428537 B1 | 11/2022 |
| WO | 2015/039832 A1 | 3/2015 |
| WO | 2017/018992 A1 | 2/2017 |

* cited by examiner

*Primary Examiner* — Scott J Walthour
(74) *Attorney, Agent, or Firm* — Carter, DeLuca & Farrell LLP

(57) ABSTRACT

A combustion section for a turbine engine. The combustion section has a circumferential casing, a combustor, multiple fuel nozzles and a fuel supply system. The circumferential casing defines an interior. The combustion has an annular liner located within the interior. The fuel supply system has a fuel manifold and multiple fuel line branches.

20 Claims, 7 Drawing Sheets

COMBUSTION SECTION FOR A TURBINE ENGINE

TECHNICAL FIELD

The present subject matter relates generally to a combustion section for a turbine engine.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOx), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
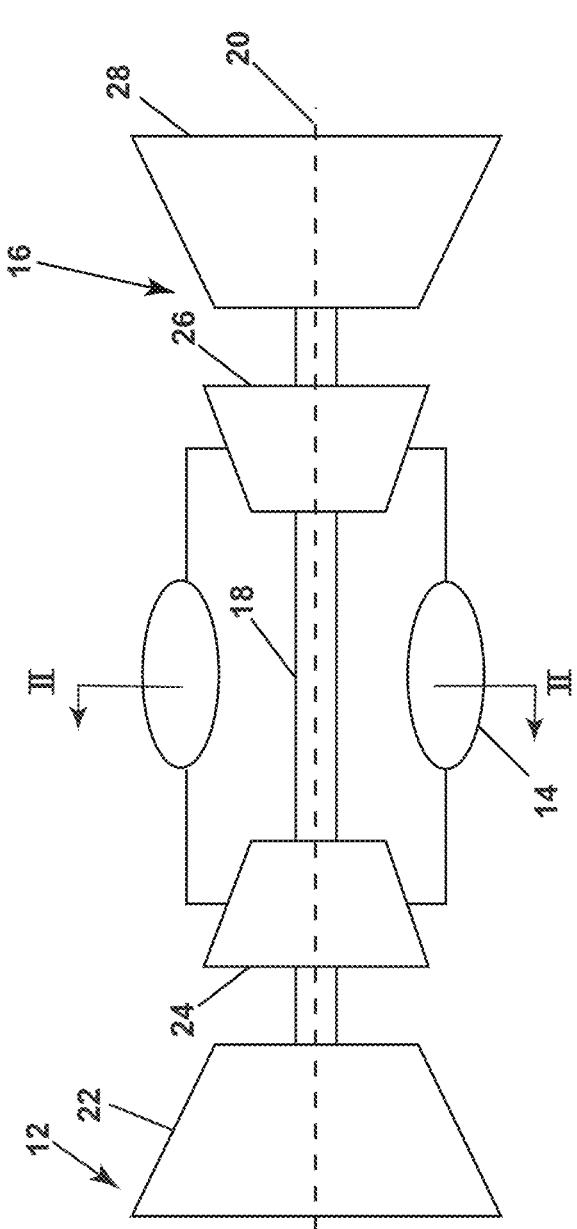
FIG. 1 is a schematic cross-sectional view of a turbine engine having a compressor section, a combustion section, and a turbine section in accordance with various aspects described herein.

Aspects of the disclosure described herein are directed to a combustion section for a turbine engine. The combustion section includes a circumferential casing, a combustor, and multiple fuel nozzles. The circumferential casing defines an interior. The combustor is located within the interior. Each fuel nozzle of the multiple fuel nozzles opens to a respective portion of the combustion chamber. A fuel supply system feeds a flow of fuel to the combustion chamber through the multiple fuel nozzles. The fuel supply system includes a fuel supply, a fuel manifold, and multiple fuel line branches. The fuel manifold and the multiple fuel line branches are located in the interior. The multiple fuel line branches open to a respective portion of the combustor or a respective portion of the multiple fuel nozzles.

The fuel supply, the fuel manifold, and the multiple fuel line branches are formed as a single, continuous body. A first joint is formed between the fuel supply and the circumferential casing. A second set of joints is formed between the multiple fuel line branches and the multiple fuel nozzles, or a respective portion of the combustor. The first joint and the set of second joints form hermetic seals. As used herein, joints of the fuel supply system are couplings or formations between the fuel supply system and a corresponding anchoring point of the combustion chamber (e.g., the circumferential casing and at least a portion of the multiple fuel nozzles).

The fuel supply system is especially advantageous for use when feeding a flow of hydrogen-containing fuel (hereinafter, "H2 fuel") to the combustion chamber via the fuel supply system. H2 fuel can include a gaseous H2 fuel, a liquid H2 fuel, or a combination thereof. The flow of H2 fuel can further be mixed with other fuels or fluids such as, but not limited to, natural gas, coke oven gas, diesel, Jet-A, or the like. H2 fuels, when compared to traditional fuels (e.g., carbon fuels, petroleum fuels, etc.), have a lower carbon emissions. However, H2 fuels burn hotter than and are relatively more unstable when compared to traditional fuels. For example, H2 fuel spreads faster and has a tendency to leak through joints formed within the fuel supply system. Put another way, H2 fuel has a high tendency to leak into undesired locations within the combustion section of conventional fuel supply systems where two or more elements coupled to one another are used. The disclosed fuel supply system, including the fuel supply, the fuel manifold, and the multiple fuel line branches formed as a unitary body minimizes the total number of joints within the fuel supply system and between the fuel supply system and other portions of the combustion section. The minimizing of the joints, in turn, minimizes the likelihood of H2 fuel leaking from the fuel supply system and into undesirable portions of the combustion section in relation to utilizing the conventional fuel supply system and H2 fuel.

For purposes of illustration, the present disclosure will be described with respect to a turbine engine. It will be understood, however, that aspects of the disclosure described herein are not so limited and that a combustion section as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first" and "second" may be used interchangeably to distinguish one component from another and are not intended to signify location or importance of the individual components.

The terms "forward" and "aft" refer to relative positions within a gas turbine engine or a vehicle, and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid, or a combination thereof. The term "fluidly coupled" means that a fluid is capable of making the connection between the areas specified. The term "fluidly exposed" means that one or more portions of an object is contacted by a fluid.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The term "nozzle" has been used in various ways in the context of gas turbine engines. In the instant application, "nozzle" refers to a component having a portion for fluid coupling to a fuel supply and having at least one portion for fluidly coupling with a combustion chamber.

All directional references (e.g., radial, axial, upper, lower, left, right, front, back, top, bottom, above, below, vertical, horizontal, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only. The dimensions, positions, order, and relative sizes reflected in the drawings attached hereto can vary.

The singular forms "a", "an", and "the" include plural references unless the context clearly dictates otherwise. Furthermore, as used herein, the term "set" or "subset" or a "set" or a "subset" of elements can be any number of elements, including only one.

Uses of "and" and "or" are to be construed broadly. For example and without limitation, uses of "and" do not necessarily require all elements or features listed, and uses of "or" are inclusive unless such a construction would be illogical.

FIG. 1 is a schematic view of a turbine engine 10. As a non-limiting example, the turbine engine 10 can be used within an aircraft. The turbine engine 10 includes, at least, a compression section 12, a combustion section 14, and a turbine section 16 in serial flow arrangement. A drive shaft 18 rotationally couples the compression section 12 and the turbine section 16, such that rotation of one affects the rotation of the other, and defines a rotational axis or engine centerline 20 for the turbine engine 10.

The compression section 12 can include a low-pressure (LP) compressor 22, and a high-pressure (HP) compressor 24 serially fluidly coupled to one another. The turbine section 16 can include an LP turbine 28, and an HP turbine 26 serially fluidly coupled to one another. The drive shaft 18 operatively couples the LP compressor 22, the HP compressor 24, the LP turbine 28 and the HP turbine 26 together. Alternatively, the drive shaft 18 can include an LP drive shaft (not illustrated) and an HP drive shaft (not illustrated). The LP drive shaft couples the LP compressor 22 to the LP turbine 28, and the HP drive shaft couples the HP compressor 24 to the HP turbine 26. An LP spool is defined as the combination of the LP compressor 22, the LP turbine 28, and the LP drive shaft such that the rotation of the LP turbine 28 applies a driving force to the LP drive shaft, which in turn rotates the LP compressor 22. An HP spool is defined as the combination of the HP compressor 24, the HP turbine 26, and the HP drive shaft such that the rotation of the HP turbine 26 applies a driving force to the HP drive shaft which in turn rotates the HP compressor 24.

The compression section 12 includes a plurality of axially spaced stages. Each stage includes a set of circumferentially spaced rotating blades and a set of circumferentially spaced stationary vanes. The compressor blades for a stage of the compression section 12 can be mounted to a disk, which is mounted to the drive shaft 18. Each set of blades for a given stage can have its own disk. The vanes of the compression section 12 can be mounted to a casing which can extend circumferentially about the turbine engine 10. It will be appreciated that the representation of the compression section 12 is merely schematic and that there can be any number of stages. Further, it is contemplated, that there can be any other number of components within the compression section 12.

Similar to the compression section 12, the turbine section 16 includes a plurality of axially spaced stages, with each stage having a set of circumferentially spaced, rotating blades and a set of circumferentially spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 is provided serially between the compression section 12 and the turbine section 16. The combustion section 14 is fluidly coupled to at least a portion of the compression section 12 and the turbine section 16 such that the combustion section 14 at least partially fluidly couples the compression section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compression section 12 via a fan (not illustrated) upstream of the compression section 12, where the air is compressed defining a compressed air. The compressed air then flows into the combustion section 14 where the compressed air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The compressed air flow and the combustion gases can together define a working air flow that flows through the fan, compression section 12, combustion section 14, and turbine section 16 of the turbine engine 10.

Figure 2:
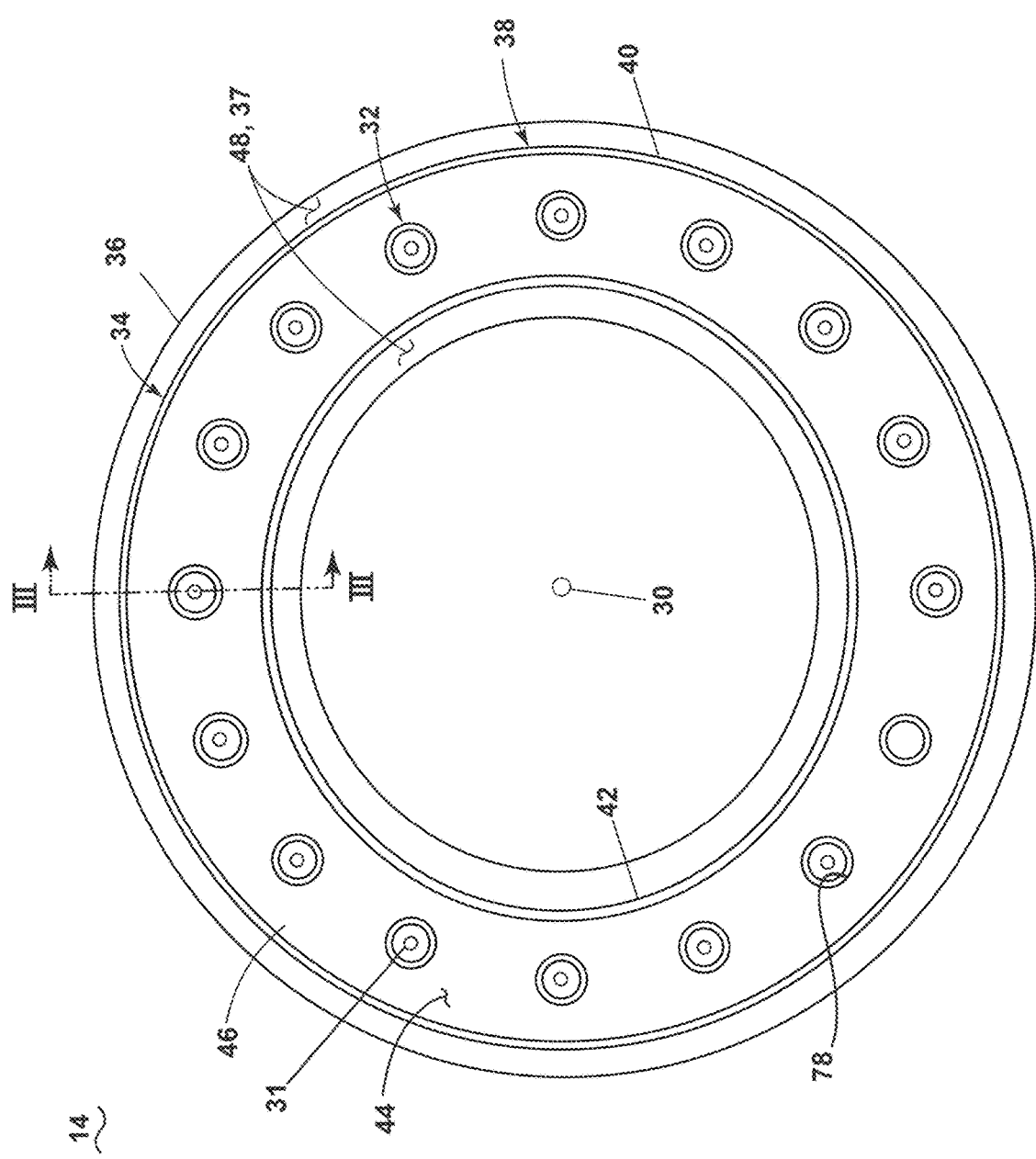
FIG. 2 is a schematic view of a combustor of the combustion section of FIG. 1 along line II-II in accordance with various aspects described herein.

FIG. 2 depicts a cross-sectional view of the combustion section 14 along line II-II of FIG. 1. For purposes of illustration, the drive shaft 18 (FIG. 1) has been removed. The combustion section 14 includes a circumferential casing 36 and a combustor 34. The combustion section 14 includes a centerline 30. The centerline 30 can be aligned with or offset from the engine centerline 20 (FIG. 1) of the turbine engine 10 (FIG. 1). The circumferential casing 36 defines an interior 37. The combustor 34 is located within the interior 37. The combustor 34 includes an annular liner 38 and a dome wall 44. The annular liner 38 can include an outer liner 40 and an inner liner 42. The dome wall 44 interconnects the inner liner 42 and the outer liner 40. The dome wall 44 and the annular liner 38 collectively form a combustion chamber 46. The combustor 34 can have a can, can-annular, or annular arrangement depending on the type of engine in which the combustor 34 is located. In a non-limiting example, the combustor 34 can have a combination arrangement as further described herein located within a circumferential casing 36 of the turbine engine 10. The annular liner 38, as illustrated by way of example, can be annular. A compressed air passageway 48 can be defined at least in part by both the annular liner 38 and the circumferential casing 36. The compressed air passageway 48 is located within interior 37.

The dome wall 44 includes a set of fuel nozzle openings 78. The combustion section 14 includes a set of fuel nozzles 32 extending through the set of fuel nozzle openings 78. The set of fuel nozzles 32 are annularly arranged about the centerline 30. The set of fuel nozzles 32 are fluidly coupled to the combustion chamber 46. Each fuel nozzle of the set of fuel nozzles 32 includes a fuel nozzle centerline 31.

Figure 3:
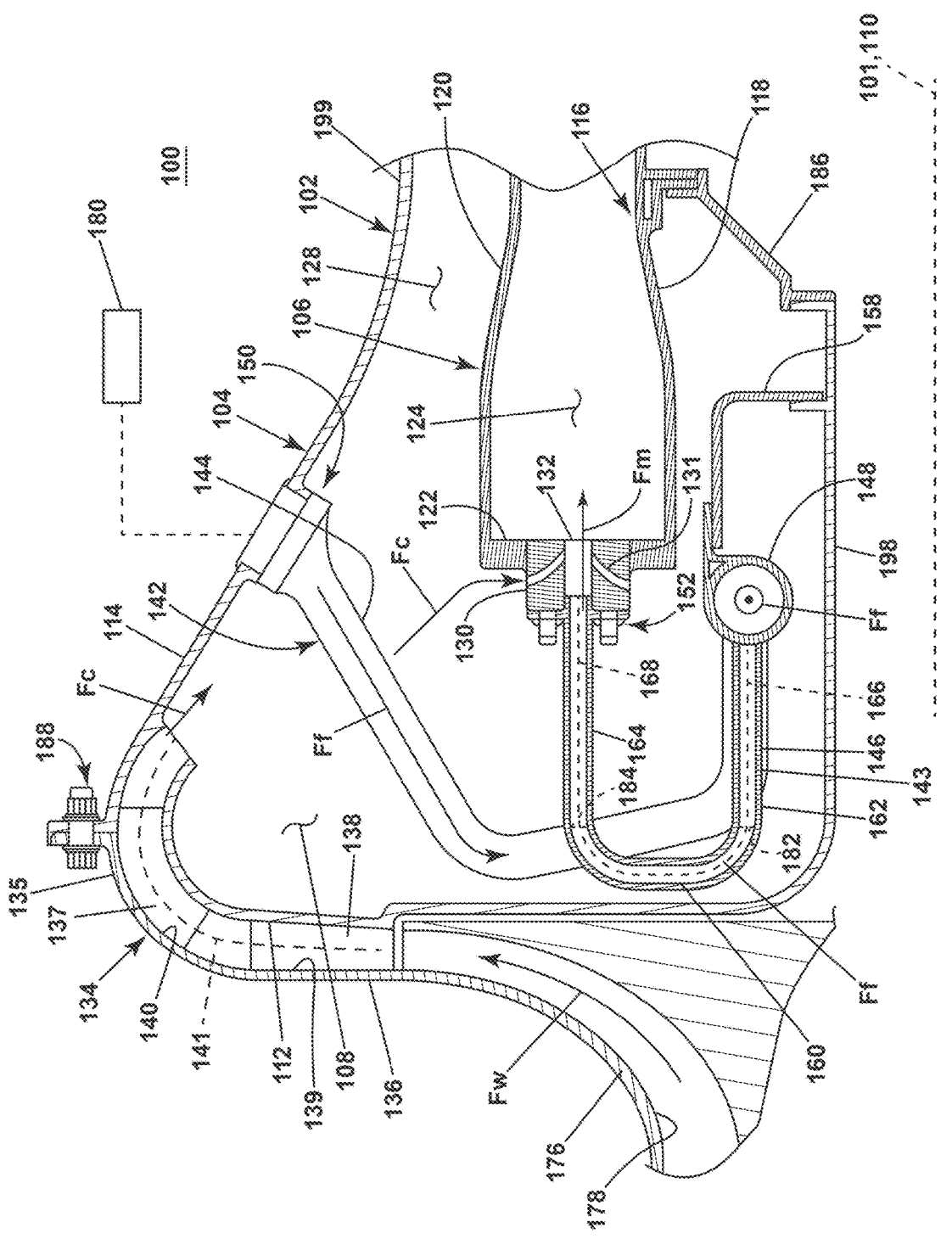
FIG. 3 is a schematic cross-sectional view illustrating an exemplary portion of a turbine engine suitable for use as the turbine engine of FIG. 1, further illustrating a combustion section including a combustor and a fuel supply system, the turbine engine including a deswirler assembly fluidly coupled to the combustion section in accordance with various aspects described herein

FIG. 3 is a schematic cross-sectional view illustrating an exemplary turbine engine 100 suitable for use as the turbine engine 10 of FIG. 1. The turbine engine 100 is similar to the turbine engine 10; therefore, like parts will be identified with like names with it being understood that the description of the turbine engine 10 applies to the turbine engine 100 unless noted otherwise.

The turbine engine 100 includes an engine centerline 101 and a combustion section 102. The combustion section 102 includes a circumferential casing 104, a fuel supply system 142 and a combustor 106. The combustion section 102 includes a centerline 110. The centerline 110, as illustrated, is aligned with the engine centerline 101. It will be appreciated, however, that at least a portion of the centerline 110 can be offset from the engine centerline 101. The circumferential casing 104 defines an interior 108.

The circumferential casing 104 can include an inner circumferential casing 198 and an outer circumferential casing 199. The interior 108 is formed radially there between. The circumferential casing 104 can include a first body 112 and a second body 114. The first body 112 can be separate from the second body 114.

The combustor 106 can include an annular liner 116 and a dome wall 122. The annular liner 116 and the dome wall 122 collectively form a combustion chamber 124. The annular liner 116 includes an inner liner 118 and an outer liner 120. The dome wall 122 interconnects the inner liner 118 and the outer liner 120. It will be appreciated that the combustor 106 can have various configurations. As a non-limiting example, the dome wall 122 can be excluded and the inner liner 118 can extend from the outer liner 120.

The combustion section 102 includes multiple fuel nozzles 130. Each fuel nozzle of the multiple fuel nozzles 130 opens at a fuel nozzle outlet 132 to a respective portion of the combustion chamber 124. Each fuel nozzle of the multiple fuel nozzles 130 can include a compressed air inlet 131 adapted to feed a flow of compressed air through a respective portion of the fuel nozzle 130. The compressed air inlet 131 can be, for example, a swirler adapted to impart a swirl on a flow of fluid flowing through the compressed air inlet 131. The amount of swirl to the flow of fluid that flows over or through the compressed air inlet 131 is quantified by a swirl number. The swirl number is defined as an integral of the tangential momentum to the axial momentum of the flow of fluid downstream of a respective compressed air inlet 131. The compressed air inlet 131 can create a swirled air flow having swirl number of greater than 0.2 and less than or equal to 1.5.

While only a single fuel nozzle is shown, the multiple fuel nozzles 130 include any number of two or more fuel nozzles. The multiple fuel nozzles 130 can extend through various portions of the combustor 106. As a non-limiting example, at least one fuel nozzle of the multiple fuel nozzles 130 can extend through a portion of the annular liner 116, the dome wall 122, or a combination thereof.

The combustor 106 is located within the interior 108. At least a portion of the inner liner 118 can be radially inward from the inner circumferential casing 198 with respect to the centerline 110. At least a portion of the outer liner 120 can be radially inward from the outer circumferential casing 199 with respect to the centerline 110. A compressed air passage 128 is formed between the circumferential casing 104 and the combustor 106.

The combustor 106 is coupled to the circumferential casing 104 such that the combustor 106 is suspended within the interior 108. The combustor 106 is coupled to the circumferential casing 104 through any suitable method. As a non-limiting example, the combustion section 102 includes a combustor arm 186 extending between the combustor 106 and the circumferential casing 104. The combustor arm 186 extends from a respective portion of the combustor 106 (e.g., the annular liner 116, the dome wall 122, or a combination thereof) to a respective portion of the circumferential casing 104 (e.g., the inner circumferential casing 198, the outer circumferential casing 199, or a combination thereof). The combustor arm 186 can be coupled to at least one of the respective portions of the combustor 106, the respective portion of the circumferential casing 104, or a combination thereof through any suitable method such as, but not limited to, welding, bolting, adhesion, fastening, frictional contact, bonding, or the like. Alternatively, the combustor arm 186 can be integrally formed with at least one of the respective portions of the combustor 106, the respective portion of the circumferential casing 104, or a combination thereof.

The turbine engine 100 includes an engine casing 176. The engine casing 176 defines a working airflow path 178 of a compression section (e.g., the compression section 12 of FIG. 1) and a turbine section (e.g., the turbine section 16 of FIG. 1) of the turbine engine 100.

The turbine engine 100 includes a deswirler assembly 134. The deswirler assembly 134 includes a deswirler 135 and a diffuser 136. The diffuser 136 is provided upstream of the deswirler 135. The deswirler 135 includes a set of deswirler walls 137 and a set of deswirler channels 140. The set of deswirler walls 137 are circumferentially spaced, with respect to the engine centerline 101. The set of deswirler channels 140 are formed circumferentially between circumferentially opposing portions of the set of deswirler walls 137. The diffuser 136 includes a set of diffuser walls 138 and a set of diffuser channels 139. The set of diffuser walls 138 are circumferentially spaced, with respect to the engine centerline 101. The set of diffuser channels 139 are formed circumferentially between circumferentially opposing portions of the set of diffuser walls 138. The set of diffuser channels 139 open to the set of deswirler channels 140. The deswirler assembly 134 includes a deswirler assembly centerline 141 extending through the set of diffuser channels 139 and the set of deswirler channels 140.

The diffuser 136 can be coupled to the deswirler 135. As a non-limiting example, the diffuser 136 and the deswirler 135 can be defined by separate bodies that are coupled to one another via any suitable coupling method such as, but not limited to, adhesion, welding, fastening, threating, bolting, or the like. Alternatively, the diffuser 136 and the deswirler 135 can be integrally formed such that the deswirler assembly 134 is formed as a single, unitary body.

The fuel supply system 142 is fluidly coupled to a fuel source 180. The fuel source 180 is any suitable container or vessel configured to hold a volume of fuel in a liquid, solid, or gaseous form. The fuel source 180 can be located within various portions of the turbine engine 100 or exterior the turbine engine 100. As a non-limiting example, the turbine engine 100 can be coupled to a wing of an aircraft. The fuel source 180 can be located within the wing.

The fuel supply system 142 includes a body 143. The body 143 is defined as a continuous series of walls, conduits, or tubes that defines fluid passages within the fuel supply system 142. The fuel supply system 142 includes a fuel supply 144, a fuel manifold 148, and multiple fuel line branches 146. The body 143 defines the fuel supply 144, the fuel manifold 148, and the multiple fuel line branches 146. The fuel supply 144 is directly fluidly coupled to a respective portion of the fuel supply system 142 located exterior the combustion section 102 (e.g., the fuel source 180). As a non-limiting example, the fuel supply system 142 can include a connecting conduit (illustrated in phantom lines between the fuel supply 144 and the fuel source 180) that fluidly couples the fuel source 180 and the fuel supply 144. The fuel supply 144 opens to the fuel manifold 148 and defines a fluid input to the fuel manifold 148. The fuel supply system 142 includes any number of one or more fuel supplies 144. As a non-limiting example, the fuel supply system 142 can include two or more circumferentially spaced fuel supplies 144, with respect to the centerline 110.

The fuel manifold 148 extends circumferentially through a respective portion of the interior 108, with respect to the centerline 110. The fuel manifold 148 can be a duct or tube that extends about an entirety of a circumferential extent of the centerline 110. Alternatively, the fuel manifold 148 can be a duct or tube that extends about less than the entirety of the circumferential extent of the centerline 110. The fuel manifold 148 can be a continuous duct or tube. Alternatively, the fuel manifold 148 can be made up of multiple segmented bodies that are circumferentially spaced from one another, with respect to the centerline 110. Put another way, the fuel manifold 148 can extend less than 360 degrees about the centerline 110.

Each fuel line branch of the multiple fuel line branches 146 extends from a respective portion of the fuel manifold 148 and to a respective fuel nozzle of the multiple fuel nozzles 130. There are any number of two or more fuel line branches of the multiple fuel line branches 146. As a non-limiting example, each fuel nozzle of the multiple fuel nozzles 130 can be fluidly coupled to a respective fuel line branch of the multiple fuel line branches 146. For example, a total number of fuel line branches of the multiple fuel line branches 146 can be equal to a total number of fuel nozzles of the multiple fuel nozzles 130.

Each fuel line branch of the multiple fuel line branches 146 includes a first leg 162, a second leg 164, and a bend 160. The first leg 162 extends between the fuel manifold 148 and the bend 160. The bend 160 interconnects the first leg 162 and the second leg 164. The bend 160 is generally defined as any transition between the first leg 162 and the second leg 164. As a non-limiting example, the bend 160 can be defined as a vertex where the first leg 162 meets the second leg 164.

For purposes of illustration, a first transition 182 is shown in phantom lines between the first leg 162 and the bend 160, while a second transition 184 is shown in phantom lines between the second leg 164 and the bend 160. The first leg 162, the bend 160, and the second leg 164, as illustrated, collectively form a U-shape. However, it will be appreciated that each fuel line branch of the multiple fuel line branches 146 has any suitable shape. Each fuel line branch of the multiple fuel line branches 146 includes a branch centerline 166.

The fuel manifold 148 can be positioned within the interior 108 at various locations. As a non-limiting example, the fuel manifold 148 can be located radially between the inner liner 118 and the inner circumferential casing 198. As a non-limiting example, the fuel manifold 148 can be located radially between the outer liner 120 and the outer circumferential casing 199. As a non-limiting example, the fuel manifold 148 can be located axially between the dome wall 122 and a respective portion of the circumferential casing 104. The variation of where the fuel manifold 148 is located is based on a construction of the combustion section 102. As a non-limiting example, placing the fuel manifold 148 to be axially aligned with the combustor 106 and being radially between the outer circumferential casing 199 and the outer liner 120 or radially between the inner liner 118 and the inner circumferential casing 198 results in a shorter, and therefore lighter, combustion section 102 in comparison to locating the fuel manifold 148 axially between the dome wall 122 and a respective portion of the circumferential casing 104 forward of the dome wall 122. Conversely, positioning the fuel manifold 148 axially between the dome wall 122 and a respective portion of the circumferential casing 104 forward of the dome wall 122 shortens the length that the multiple fuel line branches 146 need to extend in order to get to the multiple fuel nozzles 130.

The fuel manifold 148 can be coupled to a respective portion of the combustion section 102 in order to suspend the fuel manifold 148 within the interior 108. As a non-limiting example, a bracket 158 can extend between the fuel manifold 148 and a respective portion of the circumferential casing 104. The bracket 158 can be coupled to or integrally formed with the circumferential casing 104, the fuel manifold 148, or a combination thereof.

The fuel supply system 142 extends into the combustion section 102. Put another way, a first portion of the fuel supply system 142 is located within the combustion section 102, while a second portion is located exterior the combustion section 102. The fuel supply 144, the multiple fuel line branches 146, and the fuel manifold 148 are located within the combustion section 102. The fuel source 180 is located exterior the combustion section 102.

The fuel supply system 142 includes a single, unitary (e.g., continuous) body located within the combustion section 102. The body 143 (the combination of the fuel supply 144, the multiple fuel line branches 146, and the fuel manifold 148) is formed as the body 143. The fuel supply system 142 can be manufactured through any suitable method such as, but not limited to, 3D printing, casting, or the like such that the fuel supply 144, the multiple fuel line branches 146 and the fuel manifold 148 are integrally formed as a unitary body. While not illustrated, it will be appreciated that the body 143 can include two or more components coupled to one another in a fluid-tight manner. As a non-limiting example, the fuel supply 144 can be formed as a separate body from the fuel manifold 148. The fuel supply 144 and the fuel manifold 148 can then be coupled together through, for example, by welding, brazing, or a combination thereof to form the body 143. When formed by two or more bodies that are coupled to one another, additively manufactured, casted, or the like, the fuel supply 144, the multiple fuel line branches 146 and the fuel manifold 148 are said to be formed as a unitary body in which a fluid within the body 143 cannot egress from the body 143 along the transitions between the various components of the body 143.

The body 143 is coupled to the combustion section 102 at various locations. As a non-limiting example, the bracket 158 can define a coupling between the body 143 and the combustion section 102. A first joint 150 is formed between the fuel supply 144 and the circumferential casing 104. A set of second joints 152 are formed between each fuel line branch of the multiple fuel line branches 146 and the respective fuel nozzle of the multiple fuel nozzles 130. While described in terms of being connected directly to the respective fuel nozzle of the multiple fuel nozzles 130, it will be appreciated that the respective fuel nozzle can be omitted and at least one fuel line branch of the multiple fuel line branches 146 can be coupled to and extend through a respective portion of the inner liner 118, the outer liner 120, the dome wall 122, or a combination thereof. The first joint 150 and the set of second joints 152 each define physical couplings between the body 143, the fuel supply system 142 and the combustion section 102. The physical couplings can be made through any suitable coupling method such as, but not limited to, welding, bolting, adhesion, bonding, fastening, or the like.

It will be appreciated that the first joint 150 and the set of second joints 152 are each provided at locations where an interior conduit or passageway of the body 143 is fluidly coupled to a fluid conduit or fluid passageway located exterior the fuel supply system 142. For example, the first joint 150 is formed at a location where an interior fluid conduit of the fuel supply 144 opens to a conduit or tube of the fuel supply system 142 exterior the combustion section 102. The set of second joints 152 are formed at a location where the multiple fuel line branches 146 open to a respective portion of the combustion chamber 124 (e.g., through at least a portion of the multiple fuel nozzles 130, the dome wall 122, the inner liner 118, or the outer liner 120).

The deswirler assembly 134 defines a fluid coupling between the working airflow path 178 and the compressed air passage 128 of the combustion section 102. Put another way, the working airflow path 178 of an upstream portion of the turbine engine 100 (e.g., the compression section) opens to the set of diffuser channels 139, which open to the set of deswirler channels 140. The set of deswirler channels 140 open to the compressed air passage 128 of the combustion section 102.

At least a portion of the deswirler assembly 134 is formed by the engine casing 176. At least a portion of the deswirler assembly 134 is formed by the first body 112 of the circumferential casing 104. An entirety of the deswirler assembly 134 can be integrally formed with the first body 112 such that the second body 114 of the circumferential casing 104 and the deswirler assembly 134 form a unitary body.

The combustion section 102, specifically the circumferential casing 104, is coupled to the deswirler assembly 134 or otherwise to the engine casing 176 at a third joint 188. The third joint 188 is any suitable coupling between the circumferential casing 104 and the deswirler assembly 134 or otherwise to the engine casing 176 such as, but not limited to, a fastener, a weld, a layer of adhesive, an area of bonding, or the like. As discussed herein, the first body 112 of the circumferential casing 104 can be separate from the second body 114. The first joint 150 can be provided along the second body 114. As such, when the third joint 188 is disengaged (e.g., unfastened), the bracket 158 is either removed from contact with the fuel manifold 148 or from contact with the inner circumferential casing 198. Similarly, the combustor arm 186 is either removed from contact with the combustor 106 or from contact with the inner circumferential casing 198. The second body 114 and the fuel supply system 142 are removed from the first body 112 and the deswirler assembly 134. This removal of the second body 114 and the fuel supply system 142, in turn, allows for selective access to the interior 108 and the body 143.

During operation, a working airflow (Fw) is drawn from the compression section (e.g., the compression section 12 of FIG. 1) and is fed through the working airflow path 178 into the set of diffuser channels 139. The set of diffuser channels 139 are formed to reduce a velocity of the working airflow (Fw). The formation of the set of diffuser channels 139 will be described in further detail in relation to FIG. 5. The working airflow (Fw) within the diffuser 136 is then fed to the set of deswirler channels 140. The set of deswirler walls 137 are oriented such that the working airflow (Fw) fed through the set of deswirler channels 140 enters the compressed air passage 128 as a deswirled airflow (Fc) having zero tangential momentum. The orientation of the set of deswirler walls 137 enabling the deswirling of the working airflow (Fw) will be described in further detail in relation to FIG. 5.

With further reference to FIG. 3, at least a portion of the deswirled airflow (Fc) is fed to a downstream portion of the turbine engine 100 (e.g., a turbine section, such as the turbine section 16 of FIG. 1) via the compressed air passage 128. At least a portion of the deswirled airflow (Fc) is fed to the combustion chamber 124 through at least one of the compressed air inlet 131 of the multiple fuel nozzles 130, a series of holes or passages formed within a portion of the combustor 106 (e.g., at least one of the annular liner 116, the dome wall 122, or a combination thereof), or a combination thereof.

A flow of fuel (Ff) is drawn from the fuel source 180 and fed to the fuel supply 144. The flow of fuel (Ff) within the fuel supply 144 is fed to the fuel manifold 148. The flow of fuel (Ff) within the fuel manifold 148 is distributed to the multiple fuel line branches 146. The flow of fuel (Ff) within the multiple fuel line branches 146 is fed to at least a portion of the multiple fuel nozzles 130. The flow of fuel (Ff) is then fed to the combustion chamber 124 where the flow of fuel (Ff) is ignited to generate a flame within the combustion chamber 124. It will be appreciated that the flow of fuel (Ff) can be mixed with a respective portion of the deswirled airflow (Fc) prior to being ignited.

The first joint 150 and the set of second joints 152 are formed as hermetic seals. Put another way, the first joint 150 and the set of second joints 152 are formed to restrict or otherwise prevent the flow of fuel (Ff) from flowing out of the first joint 150 and the set of second joints 152 and into the compressed air passage 128.

Some fuels tend to flow through joints formed within a respective fuel supply system. Specifically, H2 fuels have a higher tendency to leak through or otherwise flow through joints within a respective fuel supply system. Put another way, even if the joints are formed as hermetic seals, at least a portion of the H2 fuel can still flow through the joints and into the compressed air passage 128. As such, it has been found to be advantageous to limit a total number of physical joints or couplings between fuel supply system 142 and the combustion section 102 and within the fuel supply system 142. It will be appreciated that forming the fuel supply 144, the multiple fuel line branches 146, and the fuel manifold 148 as a unitary body and limiting a total number of joints to the first joint 150 and the set of second joints 152, limits the locations where H2 fuel can leak from the fuel supply system 142 and into the compressed air passage 128. Put another way, the fuel supply 144, the multiple fuel line branches 146 and the fuel manifold 148 being formed as a unitary body enables the fuel supply system 142 to especially well adapted for use when H2 fuel is used within the flow of fuel (Ff).

Limiting the amount of leakage of the flow of fuel (Ff) from the fuel supply system 142 and into the compressed air passage 128, increases the ratio between fuel fed to the combustion chamber 124 and fuel leaked into the compressed air passage 128. Increasing the ratio between fuel fed to the combustion chamber 124 and fuel leaked into the compressed air passage 128 reduces fuel wastage as the higher the ratio, the higher the percentage of fuel that is combusted to generate combustion gases that are fed to downstream portions of the turbine engine 100. Therefore, the higher the ratio between fuel fed to the combustion chamber 124 and fuel leaked into the compressed air passage 128, the higher the overall efficiency of the turbine engine 100. Additionally, limiting the leakage of the flow of fuel (Ff) from the body 143, specifically H2 fuel from the body 143, limits the possibility of ignition occurring within the combustion section 102 exterior of the combustion chamber 124 (e.g., within the compressed air passage 128). Put another way, limiting the leakage of the flow of fuel (Ff) from the body 143, limiting the possibility of pockets of fuel forming within the compressed air passage 128.

It is contemplated that the working airflow (Fw) that is fed to the compressed air passage 128 as the deswirled airflow (Fc) can be at a temperature of around 1000° F. The relatively high heat of the deswirled airflow (Fc) causes portions of the fuel supply system 142 that come into contact with the deswirled airflow (Fc) (e.g., the fuel supply 144, the multiple fuel line branches 146, and the fuel manifold 148) to experience thermal expansion Further, it is contemplated that other portions of the combustion section 102 (e.g., the combustor 106) will experience thermal expansion. The flow of fuel (Ff) is at a lower temperature than the deswirled airflow (Fc). As such, the flow of fuel (Ff) cools the fuel supply system 142; specifically, the flow of fuel (Ff) cools the fuel supply 144, the multiple fuel line branches 146 and the fuel manifold 148. The cooling of the body 143 via the flow of fuel (Ff) means that the body 143 will expand at a varying rate from others portion of the combustion section 102 that do not have cooling from the flow of fuel (Ff) (e.g., the combustor 106).

The multiple fuel line branches 146 are formed to make sure that the set of second joints 152 remain in contact during use of the combustion section 102 due to thermal expansion of the combustor 106, which expands more than the body 143. Specifically, each fuel line branch of the multiple fuel line branches 146 extends axially along the respective branch centerline 166 for a total axial distance defined as an attenuation distance. The attenuation distance is selected to ensure that the multiple fuel line branches 146 or other portions of the body 143 have enough room to move within the interior 108 during expansion of the combustor 106 (through relative thermal expansion). The attenuation distance further ensures that the set of second joints 152 remain hermetic seals during use of the combustion chamber 124 by ensuring that the set of second joints 152 do not break or otherwise become disengaged due to the thermal deformation of the combustor 106 and the body 143.

The formation of the body 143 as a unitary body allows for body 143 to be removed from the combustion section 102 with ease by disengaging the first joint 150 and the set of second joints 152. The removal of the body 143 from the combustion section 102 with ease is especially advantageous for maintenance purpose. As a non-limiting example, during continued use of the turbine engine 100, the thermal deformation of the fuel supply system 142 within the compressed air passage 128 can cause thermal stresses or otherwise thermal fatigue to be experienced along portions of the fuel supply system 142. Allowing for ease of access to the interior 108 (e.g., through the third joint 188) and ease of removal from the combustion section 102 (e.g., through the first joint 150 and the set of second joints 152) greatly decreases the burden of maintenance by allowing the fuel supply system 142 within the combustion section 102 to be removed and repaired or replaced instead of having to replace the entire combustion section 102.

It is contemplated that the use of the body 143 that can be relatively easily removed from the combustion section 102 is especially advantageous for use with H2 fuels. H2 fuels have been found to detrimentally affect materials it comes into contact with, in comparison to conventional fuels. Specifically, H2 fuels cause hydrogen embrittlement which causes materials that the H2 fuels come into contact with to degrade at a faster rate than if conventional fuels were used instead. As such, the fuel supply system 142 can degrade faster due to hydrogen embrittlement than portions of the combustion section 102 when H2 fuels are used. The faster degradation of the fuel supply system 142, in turn, means that the fuel supply system 142 can have a shorter lifespan than other portions of the combustion section 102. Forming the fuel supply system 142 with the body 143 allows for relatively easy removal of the body 143 from the combustion section 102 so the body 143 can be replaced.

Figure 4:
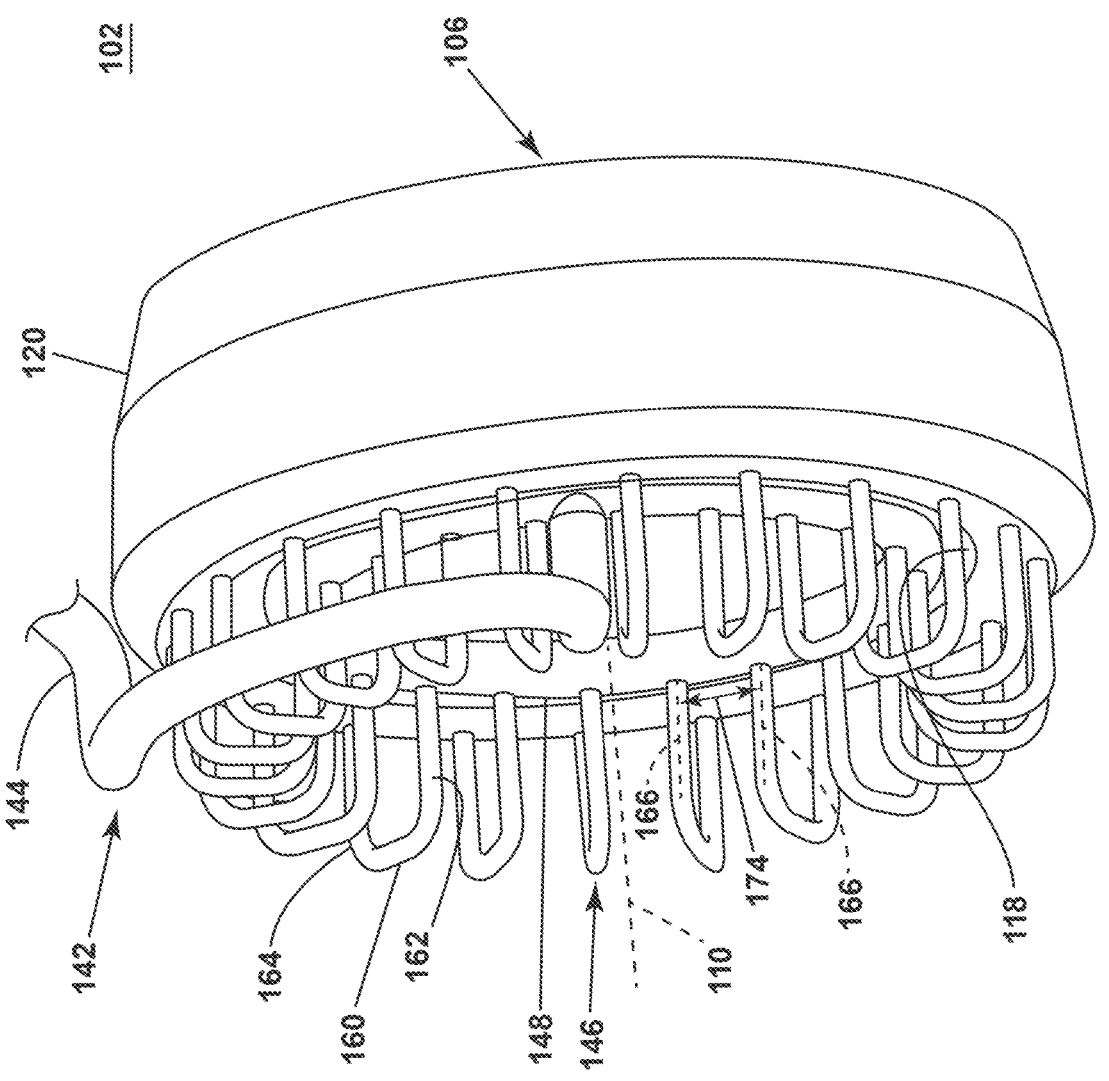
FIG. 4 is a schematic perspective view of a portion of the combustion section of FIG. 3, further illustrating a fuel manifold and multiple fuel line branches of the fuel supply system in accordance with various aspects described herein.

FIG. 4 is a schematic perspective view of a portion of the combustion section 102 of FIG. 3. The perspective view is of the combustor 106 and the fuel supply system 142 from an axially forward viewpoint looking forward. For purposes of illustration, the circumferential casing 104 (FIG. 3), and the bracket 158 (FIG. 3) have been hidden to facilitate viewing of the combustor 106 and the fuel supply system 142.

The fuel manifold 148, as illustrated, forms a continuous annulus about the centerline 110. The multiple fuel line branches 146 extend from respective portions of the fuel manifold 148 and to respective portions of the combustor 106 (e.g., the multiple fuel nozzles 130 of FIG. 3). The multiple fuel line branches 146 are circumferentially spaced with respect to the centerline 110. Each fuel line branch of the multiple fuel line branches 146 is circumferentially spaced from a circumferentially adjacent fuel line branch of the multiple fuel line branches 146 a circumferential distance 174. The circumferential distance 174 is defined as an arcuate distance between the branch centerline 166 of a first fuel line branch of the multiple fuel line branches 146 where the fuel line branch opens to the combustion chamber 124 (FIG. 3) and the branch centerline 166 of a second fuel line branch, circumferentially adjacent the first fuel line branch, of the multiple fuel line branches 146 where the second fuel line branch opens to the combustion chamber 124. The circumferential distance 174 is greater than or equal to 1 inch and less than or equal to 3 inches. The circumferential distance 174 can be equal between two or more adjacent fuel line branches of the multiple fuel line branches 146. The circumferential distance 174 can be nonequal between two or more fuel line branches of the multiple fuel line branches 146.

Figure 5:
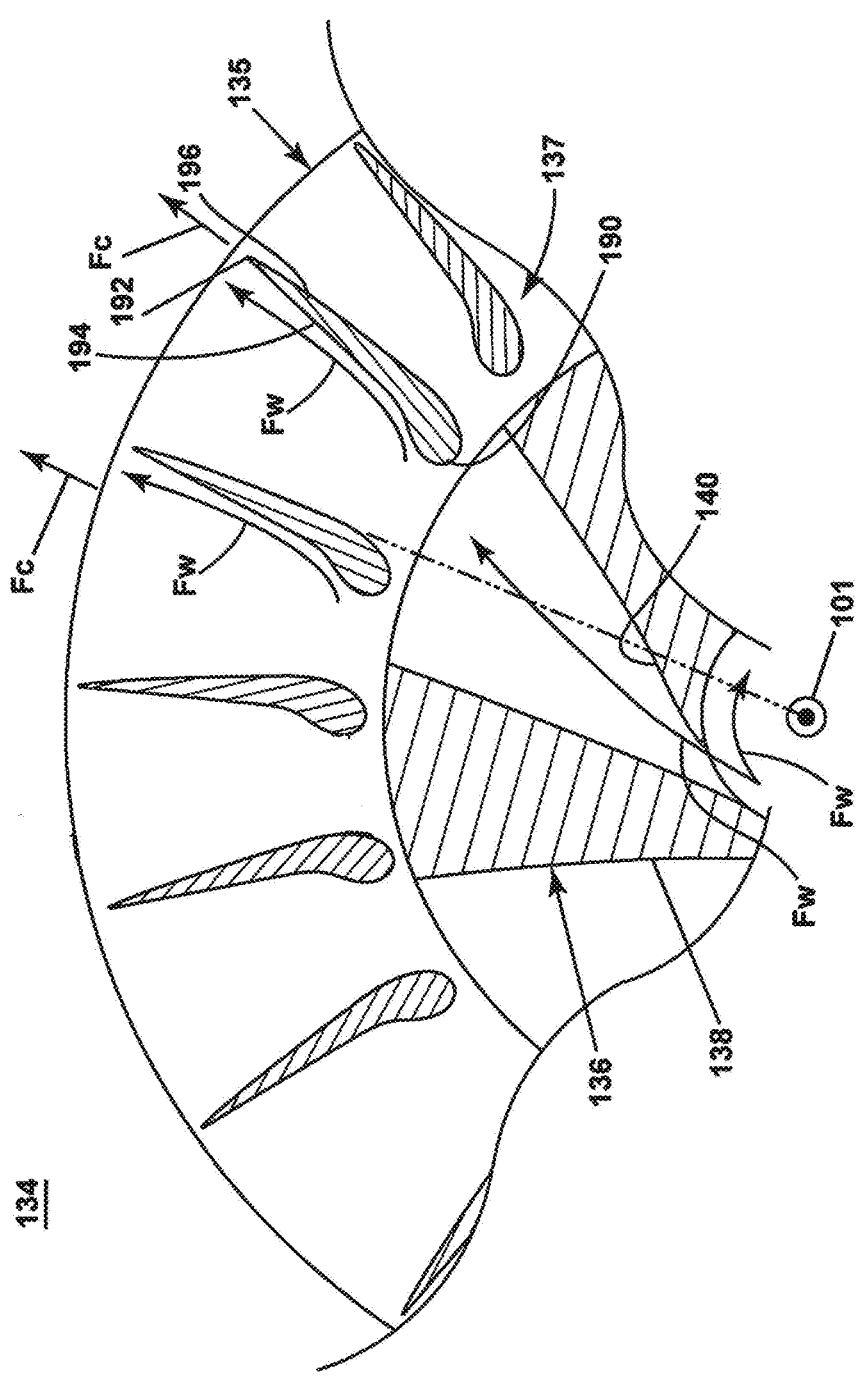
FIG. 5 is a schematic cross-sectional view of the deswirler assembly of FIG. 3, further illustrating a deswirler and a diffuser in accordance with various aspects described herein.

FIG. 5 is a schematic cross-sectional view of the deswirler assembly 134 of FIG. 3 as viewed along the deswirler assembly centerline 141. The set of diffuser channels 139 expand circumferentially as they progress radially outward from the engine centerline 101. Put another way, the set of diffuser channels 139 taper outwardly the radially farther the set of diffuser channels 139 are from the engine centerline 101. The set of deswirler walls 137 take any suitable formation. As a non-limiting example, the set of deswirler walls 137 can be formed as a set of airfoils having a leading edge 190, a trailing edge 192, a pressure side 194, and a suction side 196. Alternatively, the set of deswirler walls 137 can be formed as a continuous ring or annulus having a series of channels more similar to the set of diffuser walls 138.

During operation, the working airflow (Fw) is fed to the diffuser 136. As illustrated, the working airflow (Fw), prior to entering the diffuser 136, has a circumferential component. The working airflow (Fw) flows within the set of diffuser channels 139. As the working airflow (Fw) flows through the set of diffuser channels 139, the working airflow (Fw) velocity is reduced and static pressure is increased due to expanding nature of diffuser channels 139 (volume increase). The working airflow (Fw) from the set of diffuser channels 139 is then fed to the deswirler 135. The working airflow (Fw) flows within the set of deswirler channels 140 following a curvature defined by the pressure side 194. The set of deswirler walls 137 are oriented such that the working airflow (Fw) within the set of deswirler channels 140 is deswirled to form the deswirled airflow (Fc).

Figure 6:
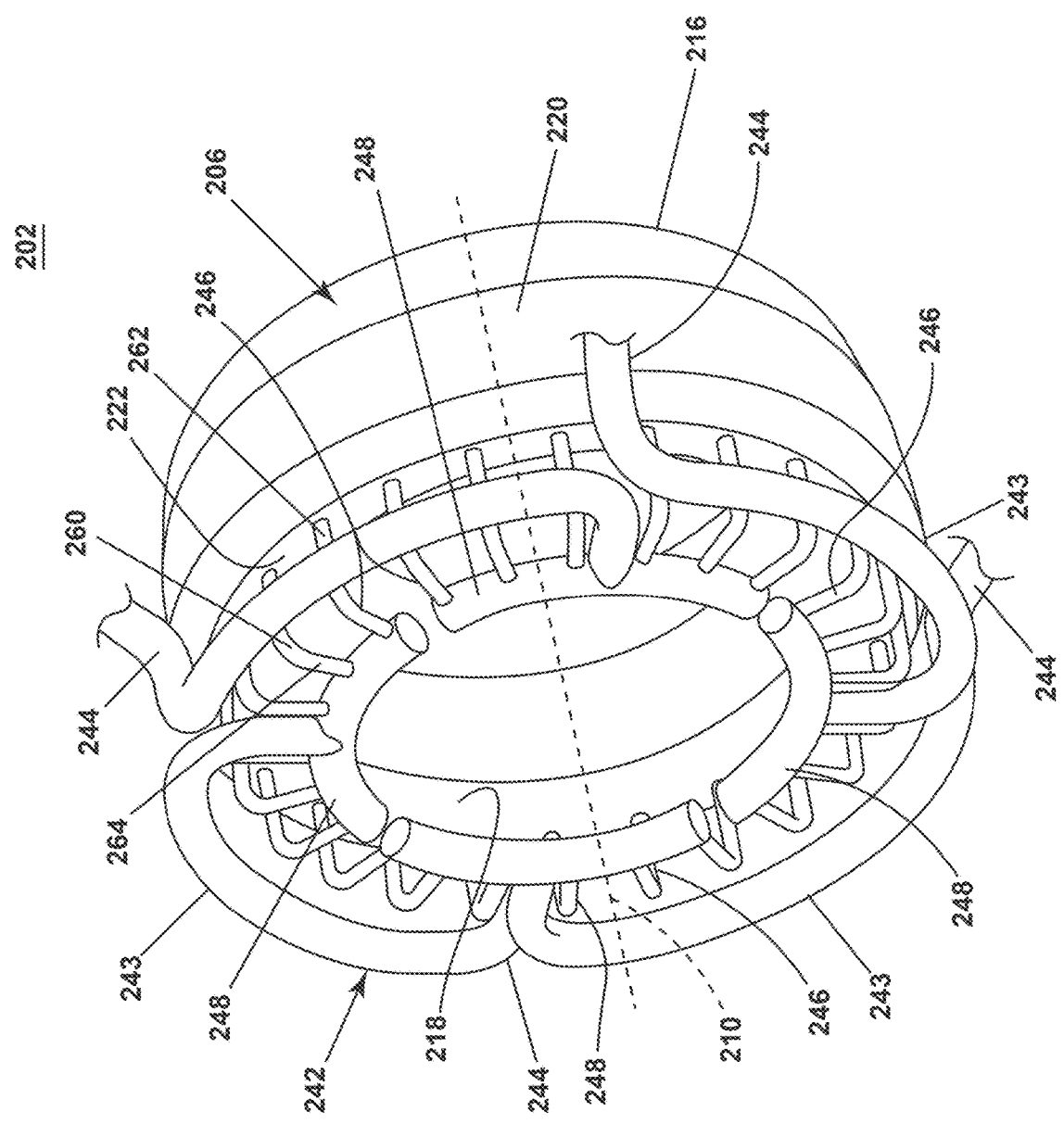
FIG. 6 is a schematic perspective view of a portion of an exemplary combustion section suitable for use as the combustion section of FIG. 3, further illustrating a fuel supply system including a fuel manifold with multiple discrete segments in accordance with various aspects described herein.

FIG. 6 is a schematic perspective view of an exemplary combustion section 202 suitable for use as the combustion section 102 of FIG. 3. The combustion section 202 is similar to the combustion section 102; therefore, like parts will be identified with like numerals increased to the 200 series, with it being understood that the description of the combustion section 102 applies to the combustion section 202 unless noted otherwise.

The combustion section 202 includes a combustor 206. The combustor 206 can be located within an interior (e.g., the interior 108 of FIG. 3) of a circumferential casing (e.g., the circumferential casing 104 of FIG. 3). For purposes of illustration, the combustor 206 is removed from the circumferential casing. The combustor 206 comprises an annular liner 216 and a dome wall 222. The annular liner 216 comprises an inner liner 218 and an outer liner 220. The combustion section 202 comprises a centerline 210. The combustion section 202 comprises multiple fuel nozzles (e.g., the multiple fuel nozzles 130 of FIG. 3) extending into a respective portion of the combustor 206. For purposes of illustration, the multiple fuel nozzles have been removed from the combustion section 202.

A fuel supply system 242 extends through a respective portion of the combustion section 202 and to a respective portion of the combustor 206. The fuel supply system comprises a fuel supply 244, multiple fuel line branches 246, and a fuel manifold 248. Each fuel line branch of the multiple fuel line branches includes a first leg 262, a second leg 264, and a bend 260.

The fuel supply system 242 is similar to the fuel supply system 142 (FIG. 3) in that the fuel supply system 242 includes a body 243 forming a unitary structure located within the combustion section 202. The fuel supply system 242, however, is segmented and includes multiple bodies 243. Specifically, the fuel manifold 248 is segmented and includes two or more discrete sections. As illustrated, the fuel manifold 248 includes four discrete segments circumferentially spaced about the centerline 210. It will be appreciated, however, that the fuel manifold 248 can include any number of two or more segments. The multiple fuel line branches 246 extend from a respective one fuel manifold 248 and to a respective portion of the combustor 206 or a respective one fuel nozzle of the multiple fuel nozzles.

Each discrete segment of the fuel supply system 242 can be fluidly coupled to a respective one fuel supply 242. As a non-limiting example, the fuel supply system 242 can include a total number of fuel supplies 244 equal to a total number of fuel manifolds 248. As a non-limiting example, the fuel supply system 242 can include four fuel supplies 244 and four fuel manifolds 248. As such, the fuel supply system 242 can include multiple bodies within the combustion section 202.

The benefit of segmenting the fuel manifold 248 is a decreased thermal deformation of the fuel manifold 248. It is contemplated that minimizing the total circumferential distance that each fuel manifold 248 extends, in turn, minimizes a total amount of thermal deformation that the fuel manifold 248 will experience. Further, the use of a multiple bodies 243 as opposed to a singular body allows for removal of and/or replacement of a section of the fuel supply system 242 within the combustion section 202 rather than an entirety of the fuel supply system 242. Put another way, a singular body of the multiple bodies 243 (e.g., a section of the fuel supply system 242) can be removed from the combustion section 202 rather than an entirety of the fuel supply system 242 within the combustion section 202.

Figure 7:
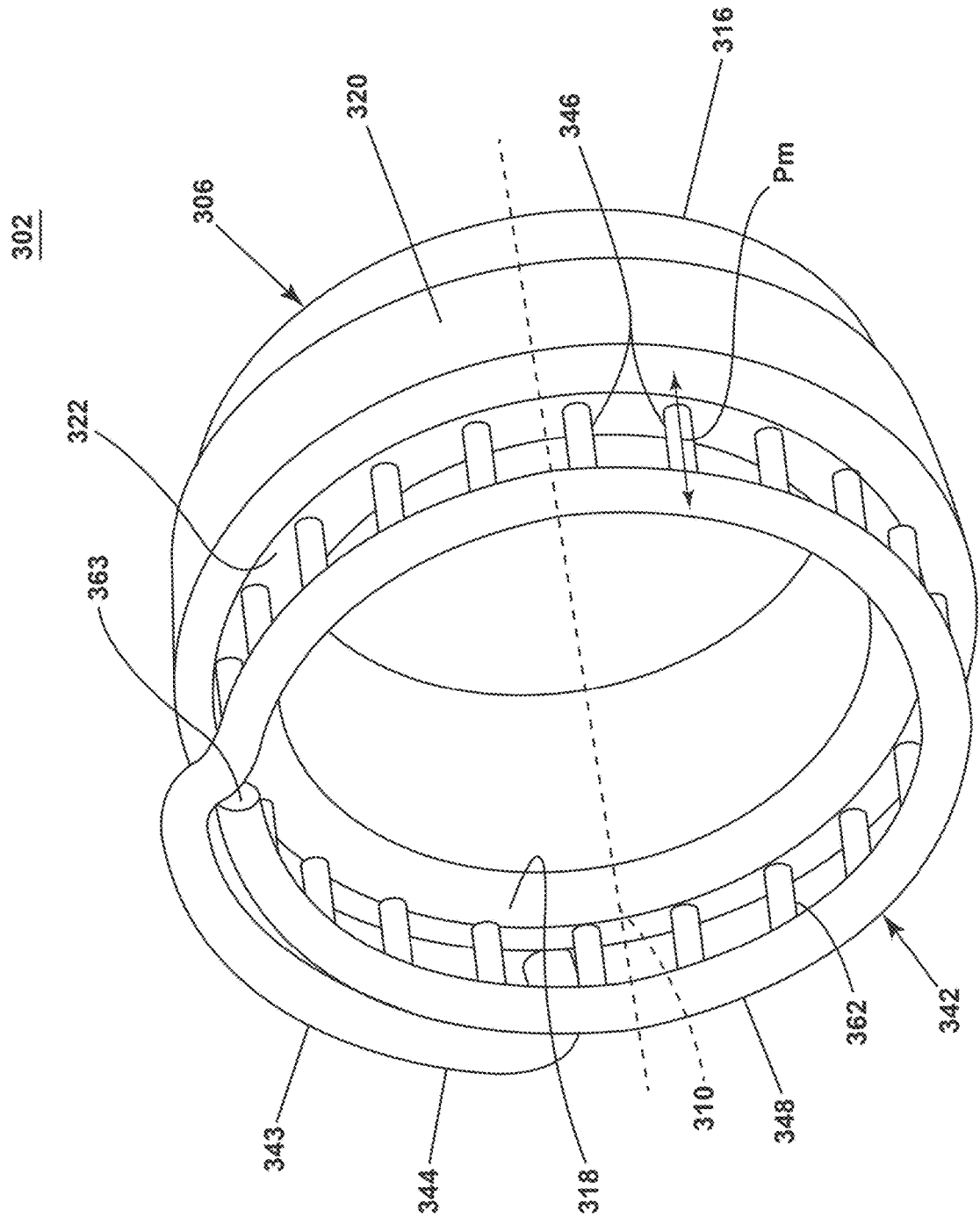
FIG. 7 is a schematic perspective view of a portion of an exemplary combustion section suitable for use as the combustion section of FIG. 3, further illustrating a fuel supply system including a fuel manifold and multiple fuel line branches, the multiple fuel line branches moveable about a plane of movement in accordance with various aspects described herein.

FIG. 7 is a schematic perspective view of an exemplary combustion section 302 suitable for use as the combustion section 102 of FIG. 3. The combustion section 302 is similar to the combustion section 102, 202 (FIG. 6); therefore, like parts will be identified with like numerals increased to the 300 series, with it being understood that the description of the combustion section 102, 202 applies to the combustion section 302 unless noted otherwise.

The combustion section 302 includes a combustor 306. The combustor 306 can be located within an interior (e.g., the interior 108 of FIG. 3) of a circumferential casing (e.g., the circumferential casing 104 of FIG. 3). For purposes of illustration, the combustor 306 is removed from the circumferential casing. The combustor 306 comprises an annular liner 316 and a dome wall 322. The annular liner 316 comprises an inner liner 318 and an outer liner 320. The combustion section 302 comprises a centerline 310. The combustion section 302 comprises multiple fuel nozzles (e.g., the multiple fuel nozzles 130 of FIG. 3) extending into a respective portion of the combustor 306. For purposes of illustration, the multiple fuel nozzles have been removed from the combustion section 302.

A fuel supply system 342 extends through a respective portion of the combustion section 302 and to a respective portion of the combustor 306. The fuel supply system comprises a fuel supply 344, multiple fuel line branches 346, and a fuel manifold 348.

The fuel supply system 342 is similar to the fuel supply system 142 (FIG. 3), in that the fuel supply system 342 includes a body 343 forming a unitary structure located within the combustion section 302. The fuel manifold 348, however, is not a continuous annulus and terminates circumferentially at a distal end 363. The fuel manifold 348, as such, is defined by a single body that extends about less than an entirety of a circumferential extent (e.g., 360 degrees) of the centerline 310. As a non-limiting example, the fuel manifold 348 can extend greater than or equal to 270 degrees and less than 360 degrees of the circumferential extent of the centerline 310.

The multiple fuel line branches 346 are formed without multiple legs (e.g., the first leg 162 (FIG. 3), 262 (FIG. 6), the second leg 164 (FIG. 3), 264 (FIG. 6)) or a bend (e.g., the bend 160 (FIG. 3), 260 (FIG. 6)). Instead, each fuel line branch of the multiple fuel line branches 346 includes a singular leg 362 extending from a respective portion of the fuel manifold 348. The singular leg 362 of each fuel line branch of the multiple fuel line branches 346 is moveable (e.g., can expand or contract) about a plane of movement (Pm). The plane of movement (Pm), as illustrated, is axially with respect to the centerline 310. However, the plane of movement (Pm) is at least one of axially, radially, circumferentially, or a combination thereof with respect to the centerline 310. The singular leg 362 of each fuel line branch of the multiple fuel line branches 346 is formed in any suitable way to allow for the expansion and contraction along the plane of movement (Pm). As a non-limiting example, the singular leg 362 of each fuel line branch of the multiple fuel line branches 346 can be formed as a bellows that expands and contracts.

During operation, the singular leg 362 of each fuel line branch of the multiple fuel line branches 346 expands or contracts about the plane of movement (Pm). The expansion or contraction can occur, for example, due to thermal deformation. The benefit of utilizing the singular leg 362 of each fuel line branch of the multiple fuel line branches 346 as opposed the formation of the multiple fuel line branches 146 (FIG. 3), 246 (FIG. 6) is that the singular leg 362 is able to extend in a straight line from the fuel manifold 348 and to a respective portion of the combustor 306 or fuel nozzle. The straight-line extension of the singular leg 362 minimizes a total footprint needed for the fuel supply system 342.

Benefits of the present disclosure include a combustion section with a decreased burden of maintenance when compared to a conventional combustion section. For example, the conventional combustion section includes a fuel supply system extending through the circumferential casing of the conventional combustion section. This configuration of the fuel supply system in the conventional combustion section can require a full disassembly of combustion section and/or the fuel supply system in order to perform maintenance on respective portions of the fuel supply system. Further, if the portions of the fuel supply system within the compressed air passage need to be replaced, an entirety of the fuel supply system may need to be replaced as the fuel supply system within the conventional combustion section is non-separable from the fuel supply system located exterior the conventional combustion section.

The combustion section as described herein, however, includes the circumferential liner having the first body and the second body that are separate from one another to provide for ease of access to the interior. The fuel supply system includes a unitary body within the interior that is coupled to respective portions of the combustion section at the first joint and the second joint. The unitary body, the first joint, and the second joint, in turn, mean that the portions of the fuel supply system most susceptible to thermal deformation (e.g., the unitary body) can be removed from the fuel supply system and replaced without having to replace a portion of the fuel supply system exterior the combustion section.

With some aspects, the disclosed combustion section and fuel nozzles can be utilized with gaseous fuel, such as hydrogen. Gaseous fuel, including hydrogen, spreads/disperses at a faster rate than atomized liquid fuel. The fuel supply system as described herein is especially adapted for use with H2 fuel. H2 fuel, when utilized, has lower NOx emissions than use of conventional fuels; thereby, allowing for a turbine engine with decreased NOx emissions. Further, in comparison with conventional fuels, H2 fuels have zero CO2 emissions.

To the extent not already described, the different features and structures of the various embodiments can be used in combination, or in substitution with each other as desired. That one feature is not illustrated in all the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A combustion section for a turbine engine, the combustion section having a centerline and comprising a circumferential casing defining an interior, a combustor having an annular liner located within the interior, the combustor having a combustion chamber, multiple fuel nozzles opening to the combustion chamber, and a fuel supply system comprising a fuel manifold located within the interior, and multiple fuel line branches, with each fuel line branch of the multiple fuel line branches extending between a respective portion of the fuel manifold and a respective portion of the combustor or a corresponding one of the multiple fuel nozzles.

The combustion section of any preceding clause, wherein the fuel supply system includes a fuel supply located within the interior and fluidly coupling the fuel manifold to a portion of the fuel supply system exterior the combustion section.

The combustion section of any preceding clause, wherein the fuel supply is coupled to the circumferential casing at a first joint.

The combustion section of any preceding clause, wherein the multiple fuel line branches are coupled to the multiple fuel nozzles at a set of second joints.

The combustion section of any preceding clause, wherein the fuel supply and the fuel manifold are integrally formed.

The combustion section of any preceding clause, wherein the fuel supply and the fuel manifold are 3D printed.

The combustion section of any preceding clause, further comprising a bracket extending between the fuel manifold and a respective portion of the circumferential casing, the bracket coupling the fuel manifold to the circumferential casing.

The combustion section of any preceding clause, wherein each fuel line branch of the multiple fuel line branches includes a bend, a first leg extending from a respective portion of the fuel manifold and to the bend, and a second leg extending from the bend and to the corresponding one of the multiple fuel nozzles.

The combustion section of any preceding clause, wherein each fuel line branch of the multiple fuel line branches has a branch centerline, with each fuel line branch extending a total axial length along the branch centerline to define an attenuation distance.

The combustion section of any preceding clause, wherein the fuel manifold extends continuously about an entirety of a circumferential extent of the centerline.

The combustion section of any preceding clause, wherein the fuel manifold includes multiple discrete segments circumferentially spaced about the centerline.

The combustion section of any preceding clause, wherein the fuel manifold extends less than 360 degrees about the centerline.

The combustion section of any preceding clause, wherein the fuel manifold is included in multiple fuel manifolds, and the fuel supply system comprises two or more discrete bodies within the combustion section, with each body of the two or more discrete bodies including a respective fuel manifold of the multiple fuel manifolds and a respective portion of the multiple fuel line branches.

The combustion section of any preceding clause, wherein each fuel line branch of the multiple fuel line branches includes a branch centerline, a circumferential distance is defined by an arcuit distance between the branch centerline of a first fuel line branch of the multiple fuel line branches where the fuel line branch opens to the combustion chamber and the branch centerline of a second fuel line branch, circumferentially adjacent the first fuel line branch, of the multiple fuel line branches where the second fuel line branch opens to the combustion chamber, and the circumferential distance is greater than or equal to 1 inch and less than or equal to 3 inches.

The combustion section of any preceding clause, wherein the circumferential casing comprises an inner casing and an outer casing, and the annular liner comprises an inner liner and an outer liner, and the fuel manifold is one of located radially between the inner casing and the inner liner, or radially between the outer casing and the outer liner.

The combustion section of any preceding clause, wherein at least one fuel nozzle of the multiple fuel nozzles extends through a respective portion of the annular liner.

The combustion section of any preceding clause, wherein a compressed air passage is formed between the circumferential casing and the combustion section.

The combustion section of any preceding clause, wherein the turbine engine comprises a deswirler assembly for fluidly coupling an upstream portion of the turbine engine to the combustion section, and the circumferential casing comprises a first body and second body removably coupled to the first body, with the deswirler assembly being at least partially defined by the first body.

The combustion section of any preceding clause, wherein the deswirler assembly comprises a diffuser and a deswirler.

The combustion section of any preceding clause, wherein the fuel manifold is configured to supply a flow of gaseous hydrogen-containing fuel to the combustion chamber.

The combustion section of any preceding, wherein the fuel manifold includes a single, continuous leg that extends about less than entirety of a circumferential extent of the centerline.

A turbine engine having a combustion section, the combustion section having a centerline and comprising a circumferential casing defining an interior, a combustor having an annular liner located within the interior, the combustor having a combustion chamber, multiple fuel nozzles opening to the combustion chamber, and a fuel supply system comprising a fuel manifold located within the interior, and multiple fuel line branches, with each fuel line branch of the multiple fuel line branches extending between a respective portion of the fuel manifold and a respective portion of the combustor or a corresponding one of the multiple fuel nozzles.

The turbine engine of any preceding clause, wherein the fuel supply system includes a fuel supply located within the interior and fluidly coupling the fuel manifold to a portion of the fuel supply system exterior the combustion section.

The turbine engine of any preceding clause, wherein the fuel supply is coupled to the circumferential casing at a first joint.

The turbine engine of any preceding clause, wherein the multiple fuel line branches are coupled to the multiple fuel nozzles at a set of second joints.

The turbine engine of any preceding clause, wherein the fuel supply and the fuel manifold are integrally formed.

The turbine engine of any preceding clause, wherein the fuel supply and the fuel manifold are 3D printed.

The turbine engine of any preceding clause, further comprising a bracket extending between the fuel manifold and a respective portion of the circumferential casing, the bracket coupling the fuel manifold to the circumferential casing.

The turbine engine of any preceding clause, wherein each fuel line branch of the multiple fuel line branches includes a bend, a first leg extending from a respective portion of the fuel manifold and to the bend, and a second leg extending from the bend and to the corresponding one of the multiple fuel nozzles.

The turbine engine of any preceding clause, wherein each fuel line branch of the multiple fuel line branches has a branch centerline, with each fuel line branch extending a total axial length along the branch centerline to define an attenuation distance.

The turbine engine of any preceding clause, wherein the fuel manifold extends continuously about an entirety of a circumferential extent of the centerline.

The turbine engine of any preceding clause, wherein the fuel manifold includes multiple discrete segments circumferentially spaced about the centerline.

The turbine engine of any preceding clause, wherein the fuel manifold extends less than 360 degrees about the centerline.

The turbine engine of any preceding clause, wherein the fuel manifold is included in multiple fuel manifolds, and the fuel supply system comprises two or more discrete bodies within the combustion section, with each body of the two or more discrete bodies including a respective fuel manifold of the multiple fuel manifolds and a respective portion of the multiple fuel line branches.

The turbine engine of any preceding clause, wherein each fuel line branch of the multiple fuel line branches includes a branch centerline, a circumferential distance is defined by an arcuit distance between the branch centerline of a first fuel line branch of the multiple fuel line branches where the fuel line branch opens to the combustion chamber and the branch centerline of a second fuel line branch, circumferentially adjacent the first fuel line branch, of the multiple fuel line branches where the second fuel line branch opens to the combustion chamber, and the circumferential distance is greater than or equal to 1 inch and less than or equal to 3 inches.

The turbine engine of any preceding clause, wherein the circumferential casing comprises an inner casing and an outer casing, and the annular liner comprises an inner liner and an outer liner, and the fuel manifold is one of located radially between the inner casing and the inner liner, or radially between the outer casing and the outer liner.

The turbine engine of any preceding clause, wherein at least one fuel nozzle of the multiple fuel nozzles extends through a respective portion of the annular liner.

The turbine engine of any preceding clause, wherein a compressed air passage is formed between the circumferential casing and the combustion section.

The turbine engine of any preceding clause, wherein the turbine engine comprises a deswirler assembly for fluidly coupling an upstream portion of the turbine engine to the combustion section, and the circumferential casing comprises a first body and second body removably coupled to the first body, with the deswirler assembly being at least partially defined by the first body.

The turbine engine of any preceding clause, wherein the deswirler assembly comprises a diffuser and a deswirler.

The turbine engine of any preceding clause, wherein the fuel manifold is configured to supply a flow of gaseous hydrogen-containing fuel to the combustion chamber.

The turbine engine of any preceding, wherein the fuel manifold includes a single, continuous leg that extends about less than entirety of a circumferential extent of the centerline.

What is claimed is:

1. A combustion section for a turbine engine, the combustion section having a centerline and comprising:
    a circumferential casing defining an interior;
    a combustor having an annular liner located within the interior, the combustor having a combustion chamber;
    multiple fuel nozzles opening to the combustion chamber; and
    a fuel supply system comprising:
        a fuel manifold located within the interior radially inward of the combustion chamber, the fuel manifold defining a fuel path configured to guide fuel in a circumferential direction about the centerline; and
        multiple fuel line branches, with each fuel line branch of the multiple fuel line branches extending between a respective portion of the fuel manifold and a respective portion of the combustor or a corresponding one of the multiple fuel nozzles.

2. The combustion section of claim 1, wherein the fuel supply system includes a fuel supply located within the interior and fluidly coupling the fuel manifold to a portion of the fuel supply system exterior the combustion section.

3. The combustion section of claim 2, wherein the fuel supply is coupled to the circumferential casing at a first joint.

4. The combustion section of claim 3, wherein the multiple fuel line branches are coupled to the multiple fuel nozzles at a set of second joints.

5. The combustion section of claim 4, wherein the fuel supply and the fuel manifold are integrally formed.

6. The combustion section of claim 5, wherein the fuel supply and the fuel manifold are 3D printed.

7. The combustion section of claim 1, further comprising a bracket extending between the fuel manifold and a respective portion of the circumferential casing, the bracket coupling the fuel manifold to the circumferential casing.

8. The combustion section of claim 1, wherein each fuel line branch of the multiple fuel line branches includes:
    a bend;
    a first leg extending from a respective portion of the fuel manifold and to the bend; and
    a second leg extending from the bend and to the corresponding one of the multiple fuel nozzles.

9. The combustion section of claim 1, wherein each fuel line branch of the multiple fuel line branches has a branch centerline, with each fuel line branch extending a total axial length along the branch centerline to define an attenuation distance.

10. The combustion section of claim 1, wherein the fuel manifold forms a continuous annulus about the centerline.

11. The combustion section of claim 1, wherein the fuel manifold includes multiple discrete segments circumferentially spaced about the centerline.

12. The combustion section of claim 1, wherein the fuel manifold extends less than 360 degrees about the centerline.

13. The combustion section of claim 1, wherein the fuel manifold is included in multiple fuel manifolds, and the fuel supply system comprises two or more discrete bodies within the combustion section, with each body of the two or more discrete bodies including a respective fuel manifold of the multiple fuel manifolds and a respective portion of the multiple fuel line branches.

14. The combustion section of claim 1, wherein:

each fuel line branch of the multiple fuel line branches includes a branch centerline;

a circumferential distance is defined by an arcuate distance between the branch centerline of a first fuel line branch of the multiple fuel line branches where the fuel line branch opens to the combustion chamber and the branch centerline of a second fuel line branch, circumferentially adjacent the first fuel line branch, of the multiple fuel line branches where the second fuel line branch opens to the combustion chamber; and the circumferential distance is greater than or equal to 1 inch and less than or equal to 3 inches.

15. The combustion section of claim 1, wherein:

the circumferential casing comprises an inner casing and an outer casing, and the annular liner comprises an inner liner and an outer liner; and the fuel manifold is located radially between the inner casing and the inner liner.

16. The combustion section of claim 1, wherein at least one fuel nozzle of the multiple fuel nozzles extends through a respective portion of the annular liner.

17. The combustion section of claim 1, wherein a compressed air passage is formed between the circumferential casing and the combustion section.

18. The combustion section of claim 17, wherein the circumferential casing comprises a first body and a second body removably coupled to the first body, and further including a deswirler assembly at least partially defined by the first body.

19. The combustion section of claim 18, wherein the deswirler assembly comprises a diffuser and a deswirler.

20. The combustion section of claim 1, wherein the fuel manifold is configured to supply a flow of gaseous hydrogen-containing fuel to the combustion chamber.

* * * * *